Dec. 19, 1939.   H. J. MEYER   2,184,194
LIQUID DISPENSING VALVE
Filed Oct. 27, 1938
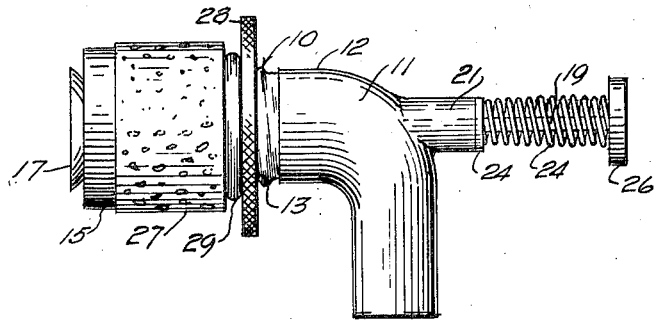
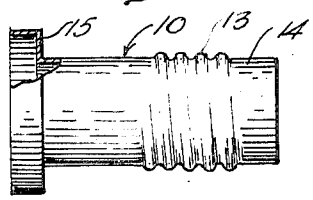
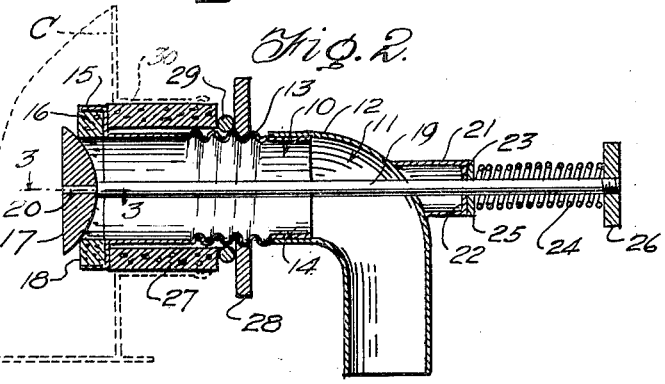
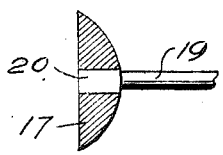
Inventor
HARRY J. MEYER,
By Kimmel & Crowell
Attorneys Patented Dec. 19, 1939

2,184,194

UNITED STATES PATENT OFFICE 2,184,194

LIQUID DISPENSING VALVE

Harry J. Meyer, Fords, N. J.

Application October 27, 1938, Serial No. 237,329

2 Claims. (Cl. 225—5)

This invention relates to a valve, and more particularly to a liquid dispensing valve.

An object of this invention is to provide an improved valve structure in the form of a dispensing valve wherein the housing portion thereof is adapted to be constructed out of sheet metal.

Another object of this invention is to provide a structure of this kind which may be constructed out of tubular sheet metal which will provide the necessary security for the sealing means and which will permit the mounting of the valve member in an outlet without the use of threads between the valve and the outlet member.

A further object of this invention is to provide a sheet metal valve structure of this kind including one part which is adapted to be so constructed as to form at one side a seat for the valve plug, and at the other side to form a seat for an annular gasket which is adapted to be compressed for the purpose of sealing the valve housing in an outlet opening.

Embodying the foregoing aims essentially and to others which may hereinafter appear, the invention consists of the novel construction, combination and arrangement of parts as will be more specifically referred to and illustrated in the accompanying drawing, wherein are shown embodiments of the invention, but it is to be understood that changes, variations and modifications may be resorted to which fall within the scope of the invention as claimed.

In the drawing:

Figure 1 is a detail side elevation of a valve constructed according to an embodiment of this invention, Figure 2 is a longitudinal section through the valve showing in dotted lines the manner of mounting the valve in the outlet of a container, Figure 3 is a fragmentary sectional view taken on the line 3—3 of Figure 2, and Figure 4 is a detail side elevation partly broken away and in section of one portion of the valve housing.

Referring to the drawing, the numerals 10 and 11 designate generally a pair of tubular members which are adapted to be connected together and which form a valve housing. The valve housing member 10 is constructed of tubular sheet metal of suitable thickness, being of cylindrical form, whereas the valve housing member 11 is constructed out of substantially the same type of metal as the housing member 10, but is constructed of L-shaped form having one side 12 thereof telescoping the adjacent or outer end of the housing member 10.

The lapping or telescoping portion of the leg 12 with the outer portion 14 of the housing member 10 is adapted to be secured together as by solder, welding or the like. The housing member 10 is provided at a point intermediate the ends thereof with threads 13 which are adapted to be formed by pressing or rolling, and this threaded portion 13 terminates between the ends of the cylindrical housing member 10. The housing member 10 at its inner end is provided with a cup-shaped flange 15 which is integral therewith, and a valve seat member 16 of ring-shaped construction is adapted to seat in the cup member 15 as shown in Figure 2.

The valve seat member 16 may be formed of substantially yieldable material such as rubber, cork, or the like, and a convex valve plug 17 is adapted to engage against the valve seat member 16. The inner edge of the valve seat member 16 is disposed at substantially right angles to the inner face 18 of the seat member 16 so that a relatively sharp corner or seat will be provided against which the convex surface of the plug 17 is adapted to engage. An elongated valve stem 19 provided with a flattened inner end portion 20 is secured to the valve plug 17 and extends axially through the housing member 10. The housing member 11 is provided with a cylindrical boss 21 which is secured as by welding or solder to the outer side of the housing member 11 and is provided in its outer wall 22 with an opening 23 through which the stem extends.

A spring 24 is disposed about the projecting end of the stem 19, and at one end engages against a washer 25 abutting against the end wall 22 and the other or outer end of the spring 24 engages against a knob or washer 26 which is threaded onto the outer end of the stem 19.

A cylindrical sealing and holding gasket 27 is disposed about the housing member 10 abutting at its inner end against the adjacent or outer side of the cup member 15. The outer end of the sealing and holding member 27 preferably overlaps the threads 13 and a compressing nut 28 is threaded onto the threads 13. A ring 29 is interposed between the nut 28 and the outer end of the sealing member 27 so that when the nut 28 is tightened, the pressure will force the ring 29 inwardly against the sealing member 28 and thus deform and expand or enlarge the sealing member 27 so that this member will tightly engage in a nipple 30 provided in a container C.

The housing member 10 is adapted to be retained in the nipple 30 by reason of the distortion or expansion of the sealing member 29 so that it will not be necessary to provide threads on the inside of the discharge nipple 30 of the container C.

In the use and operation of this valve, the housing comprising the two parts 10 and 11 is adapted to be secured in the nipple 30 with the sealing member 27 pressed under compression by tightening of the knurled nut 28. The compression of the sealing member 27 will be partly offset by the pressure of the material in the container C against the seat member 16 and also against the plug 17.

When the valve stem 19 is pushed inwardly or to the left as shown in Figures 1 and 2, the valve plug 17 will be lifted off of the seat member 16 so that the material, either liquid or dry material, may flow through the housing 10 and then downwardly through the L 11. The lower end of the L 11 is open to the atmosphere.

A valve constructed according to this invention may be made out of relatively light tubular sheet material so that the valve can be constructed very cheaply and at the same time a valve will be provided which will be suitable for the purpose for which the valve has been designed. This valve may be mounted in various types of containers, either metal or other containers, and it is not necessary in the mounting of the valve in the container that the container be provided with threads to receive the inner end of the valve housing. This is due to the fact that the valve structure is firmly held in the openings of the container by the compression or distortion of the sealing and holding member 27.

This member 27 may be constructed out of cork, rubber, or similar compressible material. This valve as disclosed in the drawing may be mounted in a container without the use of any tools whatever as the nut 28 may be turned by hand sufficiently to distort the sealing member 27 and thus not only tightly hold the valve in the nipple 30 of the container, but also to thoroughly seal the valve housing in the container.

The cup-shaped member 15 not only provides a seat or holding means for the ring-shaped valve seat 16, but also provides an abutment against which the inner end of the cylindrical sealing member 27 is adapted to engage. The valve plug 17 may be made of metal such as lead or other relatively soft material so that it will not injure the valve seat 16.

What I claim is:

1. A valve comprising a substantially L-shaped housing member formed of tubular sheet metal, threads formed on one leg of said member, an outwardly offset annular valve seat holding member integral with the free end of said one leg, said holding member having one side thereof disposed at right angles to the axis of said one leg and the other side substantially cylindrical, an annular seat engaging in said holding member, a spring pressed valve plug engaging against said seat, a cylindrical combined sealing and securing member engaging about said one leg of said housing and having the inner end thereof abutting against the adjacent side of said seat holding member, a nut engaging said threads, and a ring interposed between said nut and the outer end of said sealing member, tightening of said nut distorting said sealing member against the periphery of said one leg of said housing while simultaneously compressing the outer surface of said sealing member against the inside of a smooth opening whereby to simultaneously seal said one leg in said opening while securely holding said one leg against movement relative to said opening.

2. A valve comprising a substantially L-shaped housing member formed of tubular sheet metal, threads formed on one leg of said member, an outwardly offset annular valve seat holding member integral with the free end of said one leg, said holding member having one side thereof disposed at right angles to the axis of said one leg and the other side substantially cylindrical, an annular seat engaging in said holding member, a valve plug engaging against said seat, a cylindrical combined sealing and securing member engaging about said one leg of said housing and having the inner end thereof abutting against the adjacent side of said seat holding member, a nut engaging said threads, and a ring interposed between said nut and the outer end of said sealing member, tightening of said nut distorting said sealing member against the periphery of said one leg of said housing while simultaneously compressing the outer surface of said sealing member against the inside of a smooth opening whereby to simultaneously seal said one leg in said opening while securely holding said one leg against movement relative to said opening.

HARRY J. MEYER.